United States Patent [19]
Audoin et al.

[11] Patent Number: 5,963,525
[45] Date of Patent: Oct. 5, 1999

[54] PROCESS FOR READING INFORMATION

[75] Inventors: Michel Audoin, Villeneuve St Georges; Charaf Hanna, Strasbourg; Joseph Colineau, Bures sur Yvette; Mario De Vito, Strasbourg, all of France

[73] Assignees: Thomson-CSF, Paris; Thomson Multimedia, Courbevoie, both of France

[21] Appl. No.: 08/750,798

[22] PCT Filed: Apr. 19, 1996

[86] PCT No.: PCT/FR96/00601

§ 371 Date: Dec. 20, 1996

§ 102(e) Date: Dec. 20, 1996

[87] PCT Pub. No.: WO96/33490

PCT Pub. Date: Oct. 24, 1996

[30] Foreign Application Priority Data

Apr. 21, 1995 [FR] France .................................... 95 04820

[51] Int. Cl.$^6$ ........................................................ G11B 7/00
[52] U.S. Cl. .................................. 369/59; 369/48; 369/97
[58] Field of Search ................................... 369/59, 47, 48, 369/49, 50, 54, 58, 60, 32, 124, 93, 97

[56] References Cited

U.S. PATENT DOCUMENTS

| | | | |
|---|---|---|---|
| 4,815,067 | 3/1989 | Webster et al. | 369/97 |
| 5,566,155 | 10/1996 | Hayashi | 369/59 |
| 5,586,100 | 12/1996 | Lee et al. | 369/59 X |
| 5,602,811 | 2/1997 | Ogusu et al. | 369/59 X |
| 5,615,198 | 3/1997 | Kubokawa | 369/97 X |
| 5,633,851 | 5/1997 | Kahlman et al. | 369/97 X |

Primary Examiner—Muhammed N. Edun
Attorney, Agent, or Firm—Oblon, Spivak, McClelland, Maier & Neustadt, P.C.

[57] ABSTRACT

A process for reading binary information written on a carrier. The carrier has at least one track and the binary information is written onto the carrier at a frequency Fbit. The process includes the step of reading binary information at the sampling frequency $F_e$ to form a succession of successive read samples SAM(k) of the same track. SAM(k) is the read sample of order k, each read sample having a phase $\phi(k)$ lying between 0 and $2\pi$. The method further includes a step of interpolating to make it possible to calculate an interpolated sample I(k) with phase equal to $\pi$ which corresponds to read sample SAM(k) on the basis of the read sample and on the i+j read samples which bracket the original read sample SAM(k) such that:

$$I(k)=a_{k-i} SAM(k-i)+ \ldots +a_k SAM(k)+ \ldots +a_{k+j} SAM(k+j)$$

The coefficients have values which depend on the chosen law of interpolation and a step of validation makes it possible to generate an information item intended to validate or invalidate the interpolated sample. The process is especially useful for the reading of binary information written on a large number of tracks.

20 Claims, 8 Drawing Sheets

PROCESS FOR READING INFORMATION

BACKGROUND OF THE INVENTION

1. Field of the Invention

The invention relates to a process for reading a record carrier as well as to a device applying such a process.

The invention applies especially to the reading of magnetic or optical recordings and, more particularly, to the reading of high-density recordings. It finds a preferential application in recording systems such as computer peripherals and all business systems.

2. Discussion of the Background

In a digital recorder, the decoding of the binary information involves regenerating the time reference signal, referred to as the clock signal, which served in the recording of the information. This clock signal is usually produced by a voltage controlled oscillator (VCO) inserted into a phase locked loop (PLL) which is synchronized with the transitions of the reading signal.

In a multi-track recorder, it is possible to use a single clock signal reconstructed for the tracks as a whole, on condition that the synchronization between all the tracks written on the tape is preserved.

This presupposes that the recording heads and reading heads are aligned, and that the tape does not deform. If these conditions are not strictly complied with, the time references of the various tracks become offset one with respect to another, this being the slippage phenomenon known to those skilled in the art as "skew".

In the case in which the binary information is contained on a large number of parallel tracks, for example in the case in which the pitch between parallel tracks is of the order of 10 to 20 µm, it is virtually impossible to maintain this slippage phenomenon within acceptable limits. It is then known to produce an independent clock regeneration circuit for each track. This has numerous drawbacks including, in particular, that of having to produce a large number of circuits.

SUMMARY OF THE INVENTION

The invention does not have these drawbacks.

The subject of the present invention is a process for reading binary information written on a carrier and constituting at least one track, the said binary information having been written onto the carrier at the frequency Fbit, characterized in that it comprises:

a step of reading said binary information at the sampling frequency $F_e$ so as to constitute a succession of successive read samples SAM(k) of the same track, k being the index of the read sample SAM(k), each read sample SAM(k) having its phase $\phi(k)$ lying between 0 and $2\pi$, a step of interpolation making it possible to calculate an interpolated sample I(k) with phase equal to $\pi$ corresponding to the read sample SAM(k), on the basis of the read sample SAM(k) and of the i+j read samples (SAM(k-i), ..., SAM(k+j)) which bracket the read sample SAM(k) such that:

$$I(k)=a_{k-i} SAM_{(k-i)}+ \ldots +a_k SAM(k)+ \ldots +a_{k+j} SAM_{(k+j)},$$

the coefficients $a_{k-i}, \ldots, a_k, \ldots, a_{k+j}$ having values chosen in accordance with the law of interpolation, and a step of validation making it possible to generate an information item intended to validate or to invalidate the interpolated sample I(k).

The subject of the present invention is also a system for reading binary information written on a magnetic carrier and constituting at least one track, the said binary information having been written onto the carrier at the frequency Fbit, comprising:

a magneto-optical reading head making it possible to transform into luminous information the binary information read simultaneously on at least one track at the sampling frequency $F_e$, a charge-transfer photosensitive device gathering the said luminous information and making it possible to transform the said luminous information into a succession of voltage samples, the said photosensitive device comprising at least one output evacuating the said voltage samples, characterized in that it comprises:

delay means (1, 2) connected to the said output and making it possible to rearrange the gathered voltage samples on the said output in such a way as to obtain a succession of successive read samples SAM(k) of the same track, k being the index of the sample SAM(k) on the track, means of interpolation making it possible to calculate an interpolated sample I(k) for each read sample SAM(k) on the basis of the sample SAM(k) and of the i+j read samples which bracket the sample SAM(k) in such a way that:

$$I(k)=a_{k-i} SAM(k-i)+ \ldots +a_k SAM(k)+ \ldots +a_{k+j} SAM(k+j),$$

the coefficients $a_{k-i}, \ldots, a_k, \ldots, a_{k+j}$ having values dependent on the law of interpolation chosen, and means of validation making it possible to generate an information item (VAL) intended to validate or to invalidate the interpolated sample I(k).

An advantage of the invention is that it avoids multiplication of the clock regeneration circuits and binary information decoding circuits.

BRIEF DESCRIPTION OF THE DRAWINGS

Other characteristics and advantages of the invention will emerge on reading a preferred embodiment given with reference to the appended figures in which.

DISCUSSION OF THE PREFERRED EMBODIMENTS

In all the figures, the same labels designate the same elements.

Figure 1:
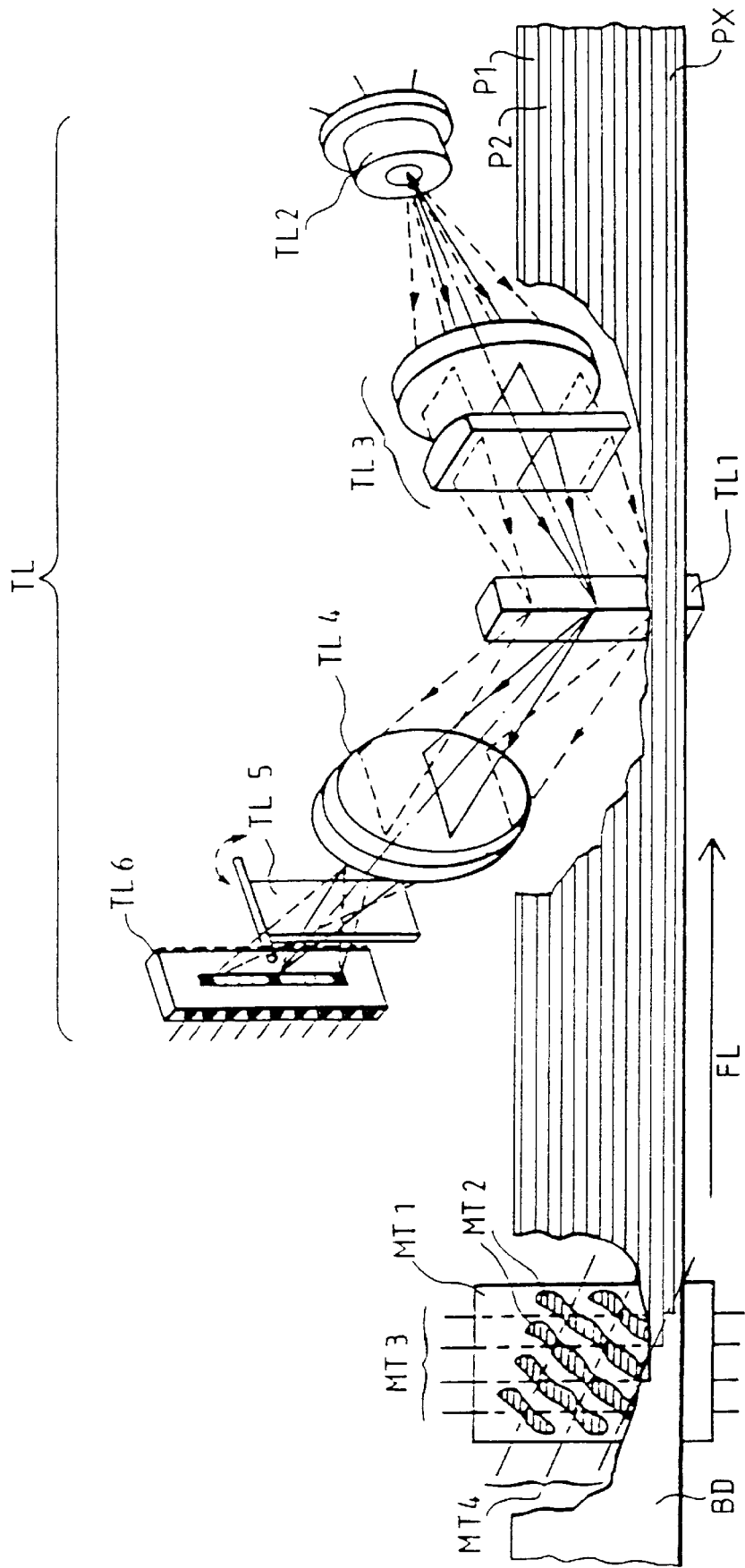
FIG. 1 represents an example of a recording/reading system to which the invention applies.

FIG. 1 represents an example of a recording/reading system to which the invention applies. Recording is carried out with a matrix head and reading with a magneto-optical system. More generally, the invention relates to other recording/reading systems. For these other systems, the carrier on which the information is recorded might not be a magnetic carrier but might be an optical carrier. It may take the form of a disk rather than a tape. Reading can be carried out by any known means other than a light beam, for example by a multitrack head with magneto-resistive elements.

The system described in FIG. 1 includes a record carrier such as a magnetic tape MT. A matrix recording head MH1 includes a matrix of elementary heads MH2 which is controlled by line selection conductors MH3 and data selection conductors MH4. This head makes it possible to record various information tracks t1, t2, . . . tX on the tape MT.

Represented on the right in the figure is a magneto-optical reading head RH such as that described in French Patent Application No. 89 17313 filed on 28 Nov. 1989 on behalf of Thomson Consumer Electronics.

This head RH includes a magneto-optical transducer RH1, for example a Kerr-effect transducer, arranged parallel to the plane of the magnetic tape and whose major length is transverse to the length of the tape. A light source RH2 illuminates, by a beam of polarized light and through a focusing system RH3, the transducer RH1 in such a way that the light beam is focused substantially as a line on a face of the transducer RH1 in proximity to the magnetic tape MT. The polarization of the beam reflected by the transducer RH1 is modified on the basis of the magnetic field on the tape. The reflected beam is transmitted by a focusing system RH4 and a tracking system RH5 to an opto-electronic detector RH6.

Preferably, the detector RH6 is a charge-transfer photosensitive device consisting of a photosensitive zone and of a non-photosensitive zone. The photosensitive zone then preferably consists of a linear array of Np pixels and the non-photosensitive zone of a read register consisting of transfer stages. The charge generated in a pixel of the photosensitive zone is gathered in a transfer stage of the read register. The detector RH6 comprises at least as many pixels as there are tracks on the tape.

The transducer RH1 reflects towards the detector RH6 a beam consisting in reality of a collection of track reading beams each having had its polarization altered by a track of the magnetic tape. This collection of reading beams is received by the detector RH6 which thus makes it possible to detect the information read on each track of the tape MT.

When the tape runs in the direction indicated by arrow FL, the magneto-optical transducer RH1 simultaneously reads the binary information of like index R (R=1, 2, . . . , k−1, k, k+1, . . . ) situated on the X parallel tracks t1, t2, . . . , tX.

The information read may have been recorded at the same instant. It may also be information recorded in a manner staggered over time. Preferably, the information read is sampled at a frequency $F_e$ greater than the frequency Fbit with which it is written on the tape MT.

Figure 2:
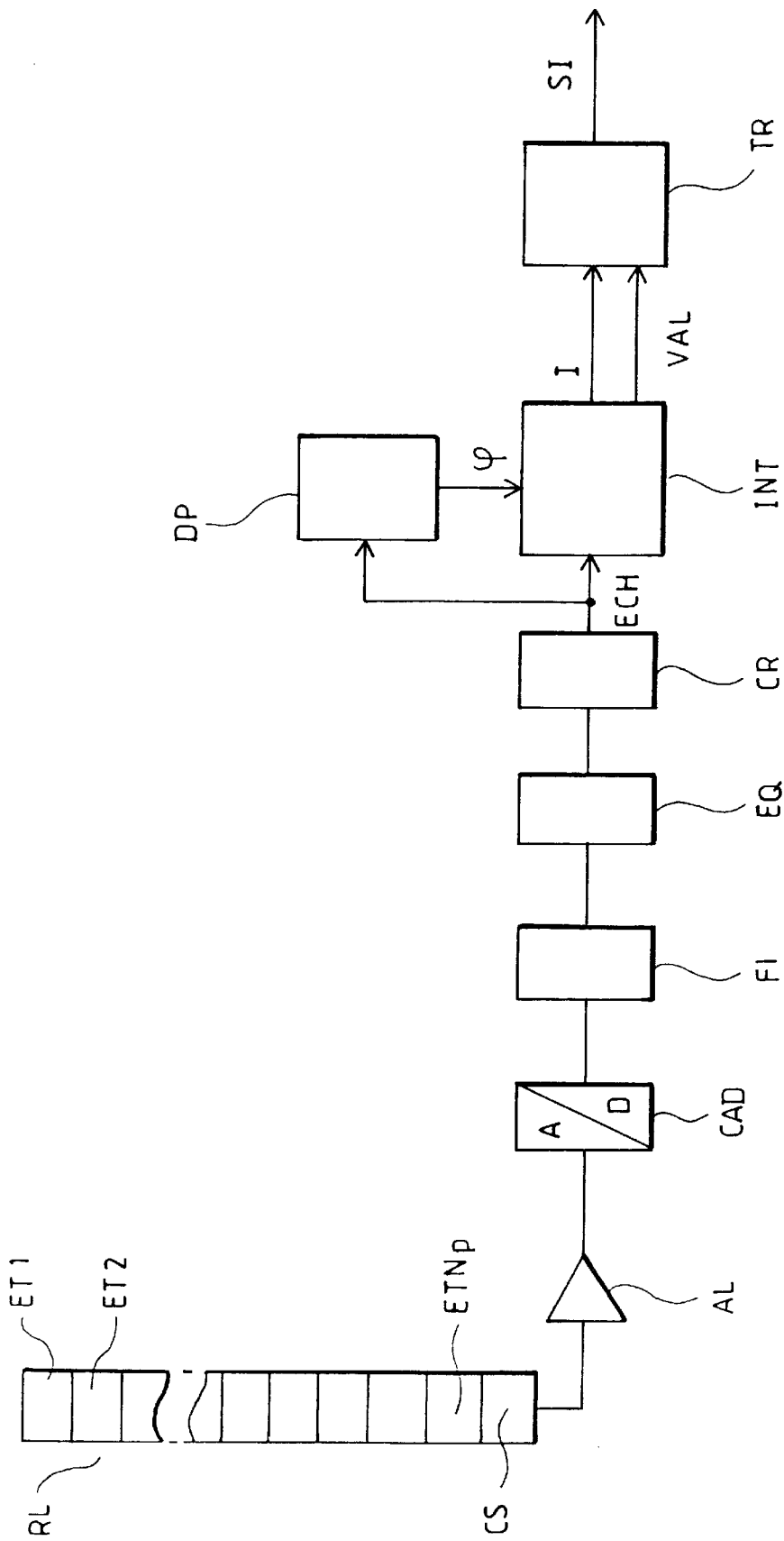
FIG. 2 represents a schematic block diagram of the device of the invention.

FIG. 2 represents a schematic block diagram of the device of the invention.

For reasons of convenience only the read register RR of the detector RH6 has been represented in FIG. 2. The read register RR consists of a succession of Np transfer stages TS1, TS2, . . . , TSNp. The output circuit OC of the read register consists of a charge/voltage converter comprising a read diode and a first read amplifier which are not represented in the figure.

The signal from the output circuit OC consists of a train of serial information. In a manner known per se, the signal from the output circuit OC passes successively through a second read amplifier RA, an analogue/digital converter ADC, a high-pass filter FI, an equalizer EQ and a corrector CR. The corrector CR is a circuit correcting the crosstalk existing between a pixel and the two neighbouring pixels surrounding this pixel. The corrector CR can be, for example, such as that described in the patent application filed in France on behalf of the Applicants on Dec. 22, 1992 and registered as number 92 15474.

As mentioned earlier, the information read simultaneously by the transducer RH1 is the information of like index k contained on the X parallel tracks. The digital operators such as the high-pass filter FI, the equalizer EQ and the corrector CR then possess as many delay circuits as is required for the successive samples which they process to represent the successive information from the same track.

In an analogue transmission channel a phase varying continuously from 0 to $2\pi$ is associated with the analogue signal read x(t). Demodulation is generally performed by observing the sign of the signal x(t) at the instant or the phase is equal to $\pi$.

In a digital transmission channel, such as that of the invention, the signal read is a string of samples whose phases are discretized. Thus, samples whose phase is equal to $\pi$ are not necessarily available. The device of the invention consists in calculating by interpolation, for each sample, a new sample, whose phase is equal to $\pi$ with the help of the neighbouring samples from the same track. The device according to the invention makes it possible to minimize the probabilities of reading error since, during decoding, the amplitude of the signal detected is calculated at its optimum phase. From this it follows that the invention is particularly advantageous in respect of signals conveyed in high-density or high-throughput channels possessing low signal-to-noise ratios.

The rate of writing the binary information, commonly referred to as bits, contained on the same track defines the frequency Fbit. The samples are extracted at the sampling frequency $F_e$ greater than Fbit and the ratio of $F_e$ to Fbit defines the oversampling factor.

According to the invention, each sample SAM from the corrector CR is sent simultaneously to a phase monitoring circuit DP and to an interpolator INT.

The function of the phase monitoring circuit DP is to estimate the phase $\phi$ of the sample SAM. The estimated phase information $\phi$ is sent to the interpolator INT.

The interpolator INT therefore receives the amplitude and the estimated phase of each sample SAM. As will be made precise in FIG. 3, the function of the interpolator INT is to calculate by interpolation the value I to be assigned to the sample of index k on the basis of the value of the sample SAM(k) of index k and of values of samples which bracket the sample SAM(k) on the same track.

According to the invention, the interpolator INT also allows the calculation of a validation signal VAL associated with the interpolated sample I and making it possible to validate or invalidate the sample I. The principle of this validation is described in detail in FIG. 3.

The interpolated sample I as well as the validation signal VAL which is associated therewith are then sent to a sort operator SRT whose function is to sort the samples I so as to retain only those which are validated. The signal SI obtained at the output of the operator SRT then consists either of the succession of the validated bits, or consists of the succession of words grouping the validated bits together into packets as described in FIG. 4.

Figure 3:
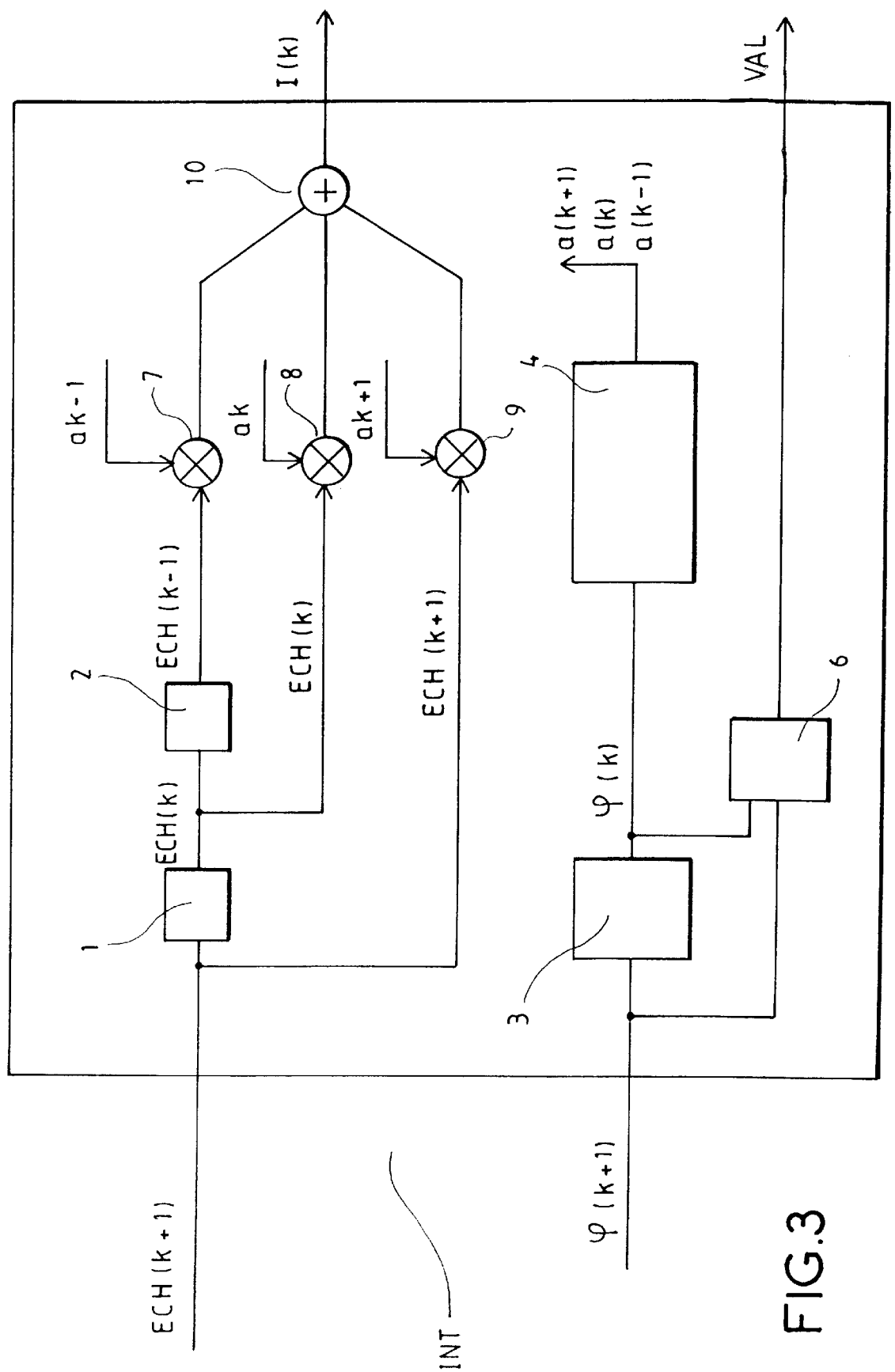
FIG. 3 represents a schematic diagram of the interpolator (INT) represented in FIG. 2.

FIG. 3 represents a schematic block diagram of the interpolator represented in FIG. 2.

According to the embodiment represented in FIG. 3, the interpolation calculation for the sample I(k) of index k is performed with the help of the three sampled values SAM(k−1), SAM(k) and SAM(k+1). More generally, the invention relates, however, to the embodiments for which the calculation of the interpolated sample I(k) is performed with the help of the i+j+1 samples SAM(k−i), SAM(k−(i−1)), ..., SAM(k), ..., SAM(k+j) where i and j are integers which may or may not be equal.

The interpolator of FIG. 3 comprises three delay operators 1, 2, 3.

The delay operator 1 contains X samples and enables the sample SAM(k−1) of index k to be restored at its output when it receives the sample SAM(k+1) of index k+1 at its input.

Similarly, the delay operator 2 whose input is connected to the output of the delay operator 1, contains X samples and enables the sample SAM(k−1) to be restored at its output when its input receives the sample SAM(k).

According to the preferred embodiment, the interpolated sample I(k) of index k is calculated with the aid of the Lagrange interpolation law. More generally, however, other interpolation laws, based on different optimization criteria may also suit.

According to the embodiment described in FIG. 3, the calculated interpolated sample I(k) can be written:

$$I(k)=a_{k-1} SAM(k-1)+a_k SAM(k)+a_{k\_1} SAM(k+1).$$

For this purpose, the samples SAM(k−1), SAM(k) and SAM(k+1) are sent to the respective multipliers 7, 8 and 9, which have the function of performing the respective multiplications of SAM(k−1) with $a_{k-1}$, of SAM(k) with $a_k$ and of SAM(k+1) with $a_{k+1}$. The results from the three multipliers 7, 8 and 9 are then sent to an adder 10 so as to calculate the interpolated sample I(k).

According to the invention, the values of the coefficient $a_{k-1}$, $a_k$ and $a_{k+1}$ depend on the interpolation law chosen. Their values are selected on the basis of the value of the phase φ(k) of the sample of index k.

Within the interpolator, the phase φ(k) appears at the output of the delay operator 3 when the latter receives the phase φ(k+1) of the sample of index k+1 on its input.

The phase φ(k) is then sent to the phase segment search operator 4. The value of the phase φ(k) lies in the interval [0,2 π]. According to the invention, the interval [0,2 π] is divided into N phase segments of width $$\frac{2\pi}{N}.$$

By way of example, N is chosen equal to 8. The invention relates, however, to other values of N preferably chosen to be all the greater the smaller the oversampling factor.

The phase φ(k) belongs to one of the N phase segments. With each phase segment there is associated a collection of three precalculated values for the coefficients $a_{k-1}$, $a_k$ and $a_{k+1}$. The phase segment search operator therefore also has the function of assigning to the interpolation calculation for the sample I(k) the values of the coefficients associated with the phase segment to which the phase φ(k) belongs.

The values of the coefficients $a_{k-1}$, $a_k$ and $a_{k+1}$ are extracted from a table. This table can be, for example, a memory of PROM type. The interpolation calculation for I(k) is then performed in real time. The samples SAM(k−1), SAM(k) and SAM(k+1) are respectively multiplied, in real time, with the coefficients $a_{k-1}$, $a_k$ and $a_{k+1}$.

According to another embodiment, the multiplications of the samples SAM(k−1), SAM(k) and SAM(k+1) by the respective coefficients $a_{k-1}$, $a_k$ and $a_{k+1}$ are performed beforehand. For each phase segment each of the possible sample values is then multiplied beforehand with each of the coefficients $a_{k-1}$, $a_k$ and $a_{k+1}$. According to this embodiment, the values of the samples as well as the values of the phases are what allow the addressing to the adder 10 of the results calculated beforehand.

According to the embodiments just described, the sample I(k) is calculated from 3 sampled values SAM(k−1), SAM(k) and SAM(k+1) and, preferably, the oversampling factor is equal to 2. The invention relates, however, to other embodiments such as, for example, that for which the interpolation is performed on the basis of five successive samples with an oversampling factor equal to 1.5.

The oversampling produces on average Ne samples for Nbits bits. The interpolation calculation leads to the calculation of Ne samples I(k). From among the samples I(k) only the Nbits to be assigned to the bits need to be retained. It is then necessary for each sample I(k) to be accompanied by an information item enabling it to be validated or invalidated.

Figure 4:
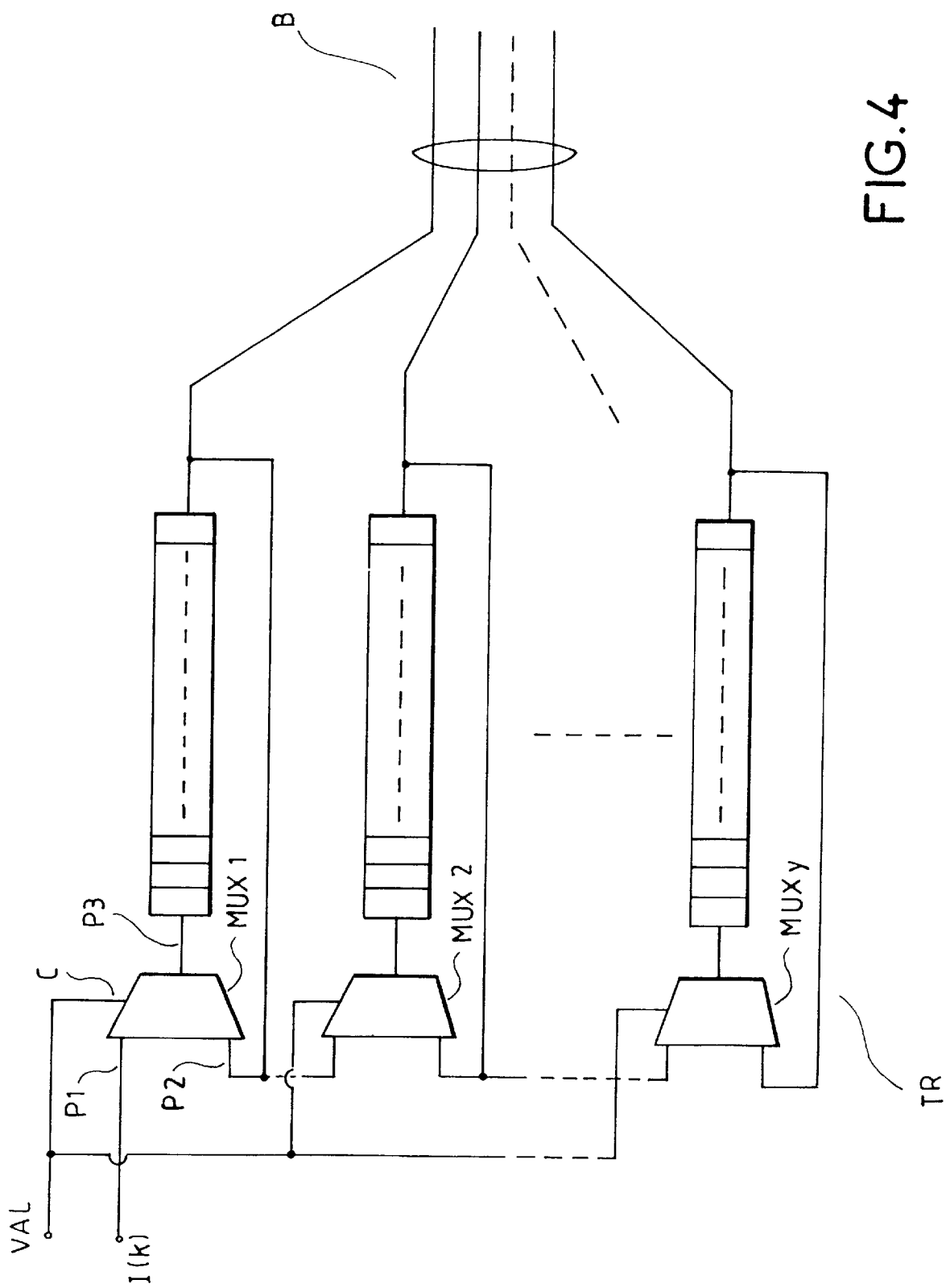
FIG. 4 represents a schematic diagram of the sort operator (SRT) represented in FIG. 2.

This information item, denoted VAL in FIG. 4, is generated by the validation operator 6.

The validation operator 6 receives as input the phase φ(k) of the sample of index k and the phase φ (k+1) of the sample of index k+1. The mean phase difference between two successive samples is equal to $$2\pi\frac{Fbit}{Fe}.$$

It is then possible to define, around the desired phase π, a validation window ranging from $$\pi-\pi\frac{Fbit}{Fe} \text{ to } \pi+\pi\frac{Fbit}{Fe}.$$

The validation operator 6 compares the values of the phases φ(k) and φ(k+1) with the upper bound of the validation window, extending the value of φ(k+1) onto the segment [0,4 π] if necessary.

If the upper bound $$\pi+\pi\frac{Fbit}{Fe}$$

belongs to the interval [φ(k),φ(k+1) [, the information item VAL takes a value signifying that the calculated sample I(k) should be validated.

If the upper bound $$\pi+\pi\frac{Fbit}{Fe}$$

does not belong to the interval [φ(k) ,φ(k+1) [, the information item VAL takes a value signifying that the calculated sample I(k) should not be validated.

The comparison constraint relating to a single bound makes it possible to guarantee a validation of a sample even in the presence of changes of tempo of information due, for example, to variations in tape running speed.

The information obtained at the output of the sort operator can consist of the single succession of validated bits. In the case, for example, of the reading of a single track, the sort operator then consists of a memory operating in tempo with the validation signal.

The information obtained at the output of the sort operator can also consist of a succession of words grouping the validated bits together into packets, as described in FIG. 4.

To form a word of y bits, y being an integer for example equal to 10, the sort operator SRT then consists of y multiplexers MUX1, MUX2, . . . , MUXy, and of y shift registers.

Each multiplexer comprises three poles P1, P2, P3 and a control input C. Under the action of a command applied to C, a link is established either between the poles P1 and P3 or between the poles P2 and P3.

Each multiplexer has its poles P3 and P2 connected respectively to the input and to the output of a shift register. Each shift register contains X stages, X being the number of tracks read. The pole P1 of the multiplexer of index 1, MUX1, receives the interpolated signal I(k) and the pole P1 of the multiplexer of index x greater than 1 (x=2, . . . , y) is connected to the pole P2 of the multiplexer of index x−1. The outputs of the y shift registers constitute, moreover, a databus B. The control inputs C of all the multiplexers are connected together and to the validation signal VAL.

With each clock beat, that is to say in tempo with the sampling frequency Fe, the validation signal is applied simultaneously to all the commands C of the multiplexers. When the signal VAL is required to validate the sample I(k), a link is established between the poles P1 and P3 of each multiplexer. It follows that the validated sample I(k) enters the shift register of index 1, whilst each shift register of index x greater than 1 (x=2, . . . , y) receives, on average, on its input the information item emanating from the shift register of index x−1. At the conclusion of a number of clock beats equal to y times the oversampling factor, a word of y bits is made up of the information item stored in the y output stages of the y shift registers. A synchronized device for counting the number of bits stored for each track guarantees the completeness of the reconstituted word. This word is then retrieved on the databus B.

An advantage of the invention is that of working at a frequency which is not the frequency Fbits.

According to the embodiment described in FIG. 2, the optoelectronic detector RH6 is a charge-transfer device whose read register comprises just a single output circuit.

According to other embodiments, however, the read register of the optoelectronic detector RH6 can have several outputs. Advantageously, it is then possible to evacuate the charge contained in the read register at a high rate.

Figure 5:
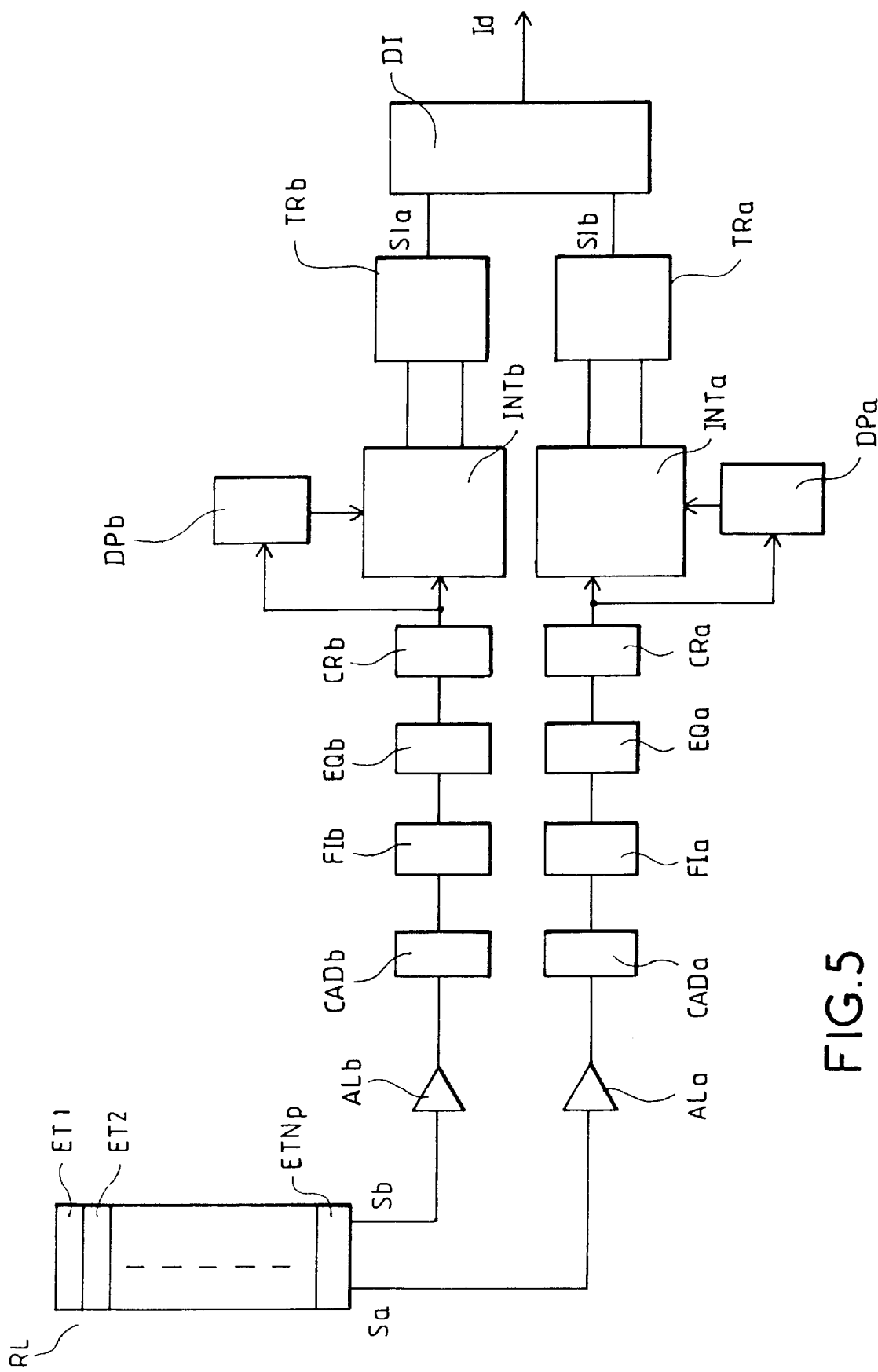
FIG. 5 represents a first application of the device according to the invention.

FIG. 5 represents a first application of the device according to the invention for which the read register comprises two outputs.

According to this first application, the read register is split in a manner known per se into a so-called "even" register and a so-called "odd" register. The even register retrieves the charge accumulated in the pixels of even index of the photosensitive zone and the odd register retrieves the charge accumulated in the pixels of odd index of the photosensitive zone.

Figure 6:
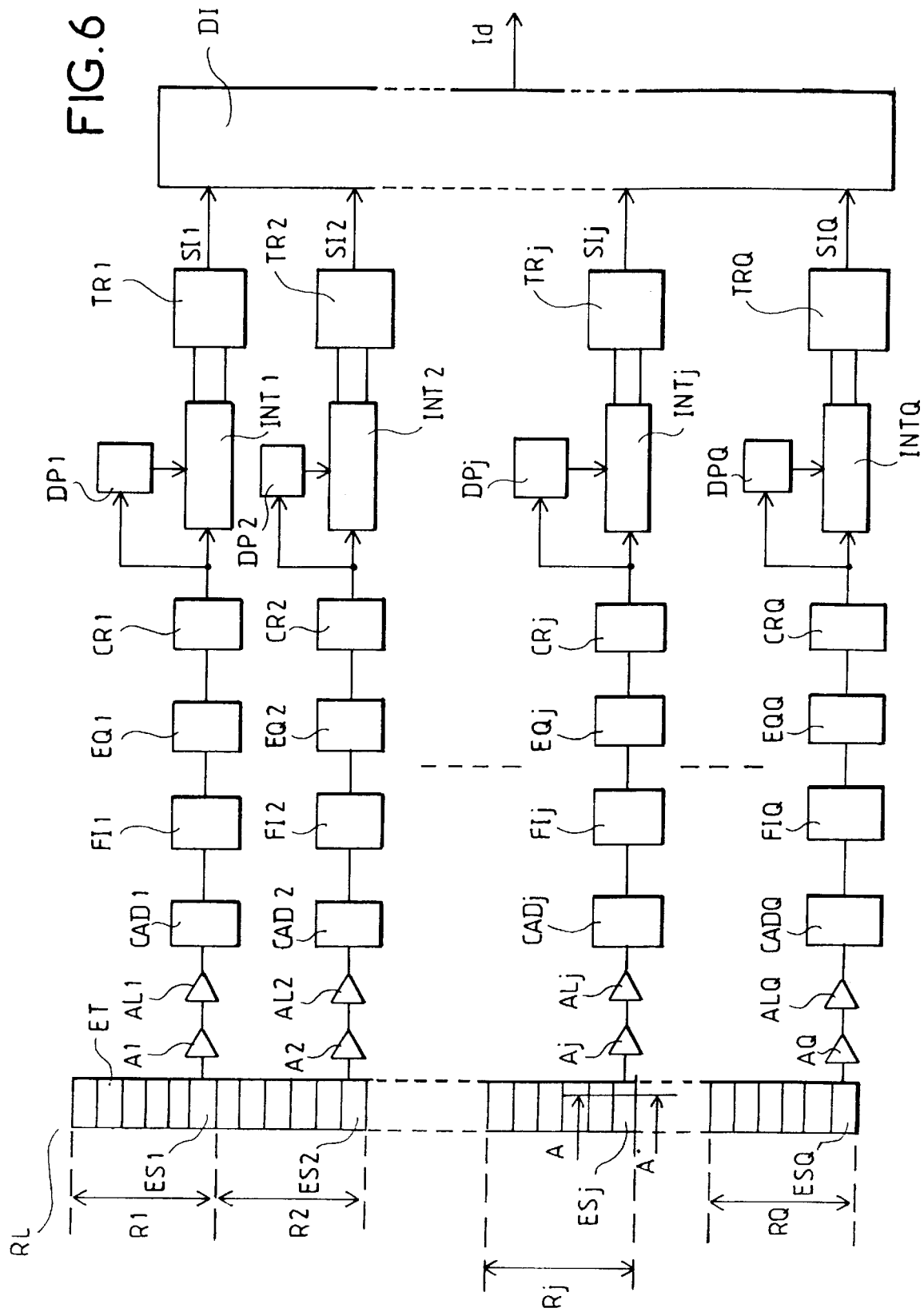
FIG. 6 represents a second application of the device according to the invention.

Symbolically, this division of the read register into even and odd registers has been represented in FIG. 6 by the presence of the two individual outputs Sa and Sb.

Each of the signals from the respective outputs Sa and Sb is then transferred into a read chain of the type of that described in FIG. 3.

In order to reconstitute the desired information item in its entirety, a device DI makes it possible to rearrange the signals SIa and SIb from the respective sort operators SRTa and SRTb.

FIG. 6 represents a second application of the device according to the invention for which the read register comprises a number Q of outputs.

The read register RR consists of Q sub-registers (R1, R2, . . . , Rj, . . . , RQ) and each sub-register comprises M transfer stages. For reasons of convenience the number M has been chosen, by way of example, equal to 6. The device according to the invention relates, however, to other embodiments where M is any integer which may be different for two different sub-registers. The M transfer stages of each sub-register Rj follow one another in such a way that the charge is transferred from the stage of index 1 to the stage of index M. The read diode of the charge/voltage converter of the sub-register Rj of index j is integrated into the transfer stage of index M of the sub-register Rj. This transfer stage is denoted ESj in FIG. 6 and will subsequently be referred to as the intermediate output stage.

Advantageously, the read register RR is such that the transfer stages of the sub-registers Rj (j=1, 2, . . . , Q) follow one another in such a way that the intermediate output stage ESj of each sub-register Rj adjoins the stage of index 1 of the sub-register Rj+1.

The charge/voltage converter of each sub-register Rj consists overall of the read diode contained in the intermediate output stage ESj and of a first read amplifier Aj which may or may not, in whole or in part, be integrated into the component to which the read register belongs.

As is known to those skilled in the art, a MOS transistor (not represented in the figure) precharges the capacitance of the diode before the arrival of the charge conveyed into the sub-register Rj.

Each of the signals from the amplifiers Aj (j=1, 2, . . . , Q) is then transferred into a read chain of the type of that described in FIG. 2. In order to reconstitute the desired information item Id in its entirety, the signals SI1, SI2, . . . , SIj, . . . , SIQ from the respective sort operators SRT1, SRT2, . . . , SRTj, . . . , SRTQ are rearranged in a device DI.

Figure 7:
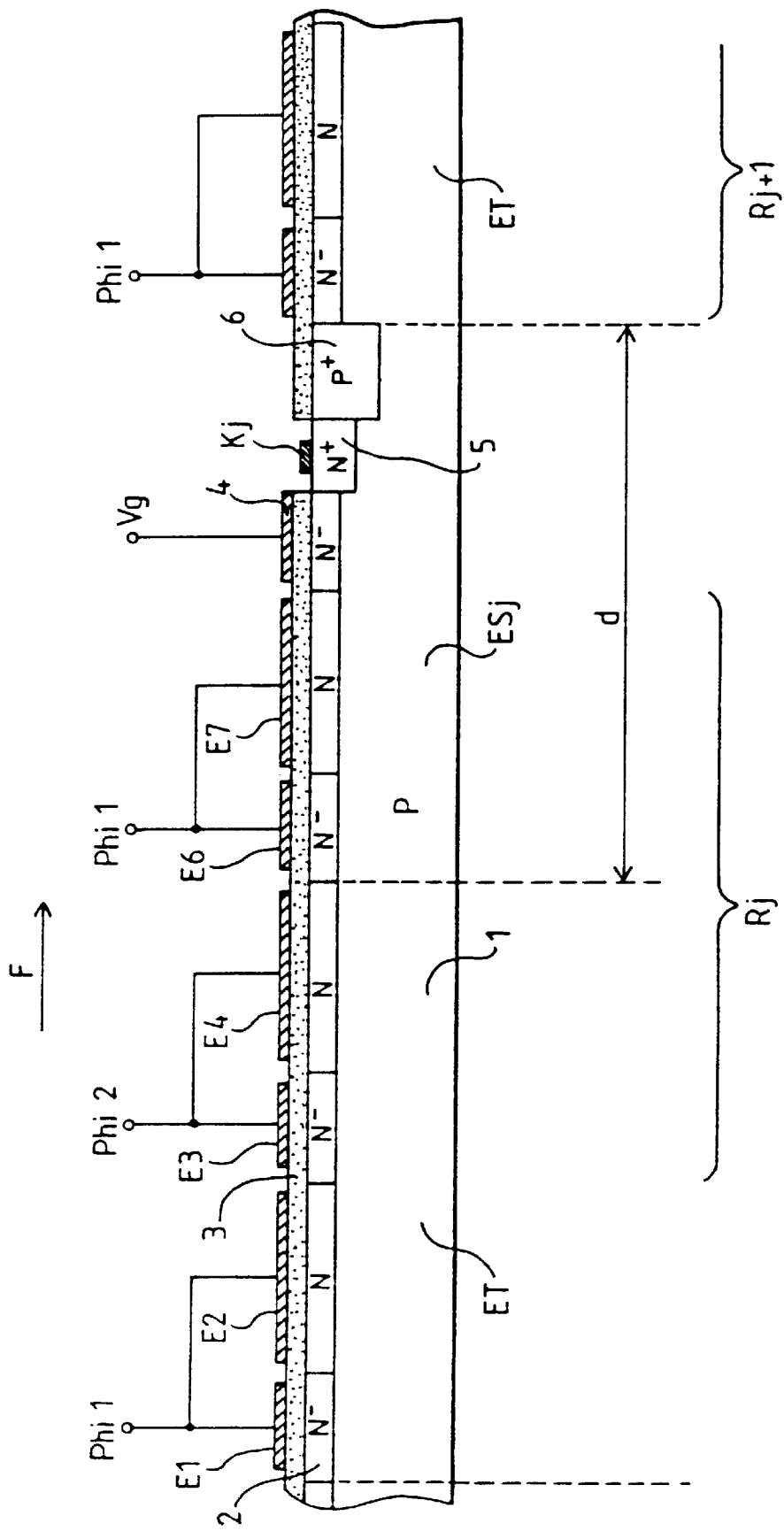
FIG. 7 represents the view on the section A—A of FIG. 6 of a first embodiment of the second application.

FIG. 7 represents the view on the section A—A of FIG. 6.

Represented in FIG. 7 are a fraction of the sub-register Rj of index j as well as a fraction of the sub-register Rj+1 of index j+1. The represented fraction of the sub-register Rj consists of a transfer stage TS of known type and of the intermediate output stage ESj. The represented fraction of the sub-register Rj+1 is a fraction of the transfer stage TS of known type which adjoins the intermediate output stage ESj.

By way of example, the transfer mode chosen is of the two-phase type. The invention relates, however, to modes of transfer for which the number of phases is greater than two.

The transfer stage TS is formed in a P-doped substrate 1. A N-doped layer 2 covers the substrate 1 so as to constitute a buried channel. As is known to those skilled in the art, in two-phase mode, the N-doped layer 2 consists of a succession of zones alternately doped $N^-$ and N. An $N^-$ doped zone is understood to mean an N doped zone but doped at a lower proportion than an N doped zone. An electrically insulating layer 3 covers the doped layer 2. The electrodes which allow transfer are produced on top of the electrically insulating layer 3.

According to the two-phase transfer mode chosen as an example, four electrodes E1, E2, E3, E4 participate in the transfer of charge in the stage TS.

In the direction F defined as going from sub-register Rj to sub-register Rj+1, the 4 successive electrodes E1, E2, E3 and E4 respectively cover zones doped N⁻, N, N⁻, N of the buried channel 2. The two electrodes E1 and E2 are connected to the same phase Phi1 and the two electrodes E3 and E4 are connected to the same phase Phi2.

The phases Phi1 and Phi2 are adjusted in a known manner in order to ensure the transfer of charge from the transfer stage TS of sub-register Rj to the intermediate output stage OSj of the same sub-register.

The intermediate output stage OSj is also formed in the P-doped substrate 1. In the charge transfer direction, the intermediate output stage comprises in succession: two electrodes E6 and E7 connected to the same phase Phi1, an output electrode 4 to which a voltage Vg is applied, a zone 5 doped N⁺ and a zone 6 doped P⁺, the zones 5 and 6 being both formed in the substrate 1.

The read diode is formed by the junction between the N⁺ doped zone and the P doped substrate 1.

The electrodes E6 and E7 are situated on the surface of the electrically insulating layer 3 and respectively cover an N⁻ doped zone and an N doped zone of the buried channel 2. The electrode 4 is also situated on the surface of the layer 3 and covers an N⁻ doped zone. The voltage Vg applied to the electrode 4 allows the transfer of charge into the read diode. The P⁺ doped zone 6 constitutes an insulation barrier between sub-register Rj and sub-register Rj+1. The voltage which appears on the terminals of the read diode is applied to the input of the first read amplifier Aj (not represented in the figure) by way of the conducting connection Kj.

During the transfer of charge from the photosensitive zone to the read register, the intermediate output stage retrieves the charge accumulated in the pixel adjoining it. Advantageously, the transfer of charge to the output amplifier Aj of each sub-register Rj is then performed in idle time.

The N⁺ doped zone 5 stretches in the direction perpendicular to the direction of propagation of charge over the whole of the width of the intermediate output stage. It follows that the electric field which makes it possible to accelerate the charge towards the diode is constant. The acceleration of the charge being uniform, it is also transferred uniformly and, hence, more rapidly than in read registers of known type.

Figure 8:
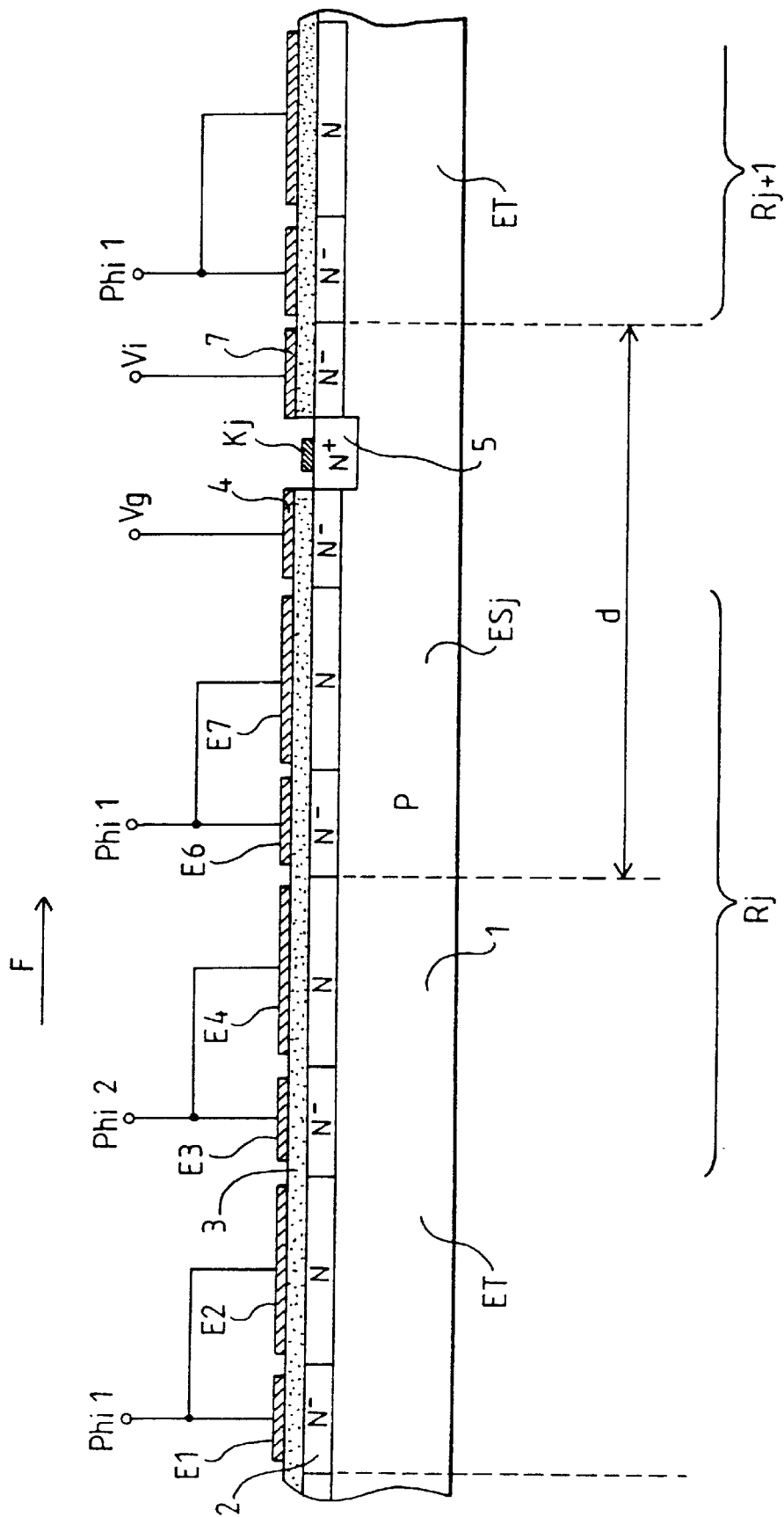
FIG. 8 represents the view on the section A—A of FIG. 6 of a second embodiment of the second application.

FIG. 8 represents the view on section A–A of FIG. 6 of a second embodiment of the read register.

Like FIG. 7, FIG. 8 represents a fraction of sub-register Rj of index j as well as a fraction of sub-register Rj+1 of index j+1. The mode of transfer chosen is of the two-phase type, but, as mentioned earlier, the invention also relates to transfer modes for which the number of phases is greater than two.

The transfer stages TS represented in FIG. 8 are identical to those represented in FIG. 7. The same is true for the intermediate output stage OSj except as regards the element making it possible to constitute the insulation barrier between sub-register Rj and sub-register Rj+1. The insulation barrier is made by an electrode 7 to which a potential Vi is applied. The electrode 7 is situated on the surface of the layer 3 and covers an N⁻ doped zone.

Advantageously, the use of a photosensitive device such as that described in FIG. 6 makes it possible to provide very high information throughputs. For example, the use of an optoelectronic detector RH6 having 1024 pixels and 32 outputs and used to read a tape with 1000 tracks provides an information throughput of the order of several hundred Mbits per second.

What is claimed is:

1. A process for reading binary information written on a carrier in at least one track, the binary information having been written onto the carrier at a frequency Fbit, said process comprising:

reading said binary information at a sampling frequency $F_e$ so as to form a succession of successive read samples from the at least one track, each read sample being a read sample of order k, k being a positive integer, each of the read samples of order k having a phase $\phi(k)$ lying between 0 and $2\pi$;

calculating an interpolated sample with a phase equal π to using a particular read sample and a number of successive ones of the succession of read samples which precede and follow the particular read sample, with each of the number of successive ones of read samples and the particular read sample being weighted by a related coefficient having a respective value dependent on a particular law of interpolation chosen; and providing an information item indicating whether or not the calculated interpolated sample is a validated interpolated sample or an invalidated interpolated sample.

2. The reading process according to claim 1, wherein the providing an information item step includes comparing a phase interval determined by two phase indicating signals indicating the phase $\phi(k)$ associated with the particular read sample and a phase $\phi(k+1)$ of a consecutive read sample of the succession of successive read samples with a value of an upper bound of a validation window and providing the information item indicating the interpolated sample to be validated when the upper bond does not exceed the phase interval indicated by the phase indicating signals.

3. The reading process according to claim 2, further comprising:

selecting the values of the related coefficients from pre-calculated tables based upon the value of the phase $\phi(k)$ of the particular read sample.

4. The reading process according to claim 2, further comprising:

selecting the weighted values which may be taken by the particular read sample and the number of the successive ones of the succession of read samples being used after weighting by the related coefficient from a table; and precalculating the weighted values for said table for N phase segments, N being a positive integer and each of the phase segments having a width $N/2\pi$, wherein the values of the particular read sample and for the number of the successive ones of the succession of read samples are taken from among all values which may be taken by any of the read samples so that the values taken are values corresponding to a phase segment to which the phase $\phi(k)$ of the particular read sample belongs.

5. The reading process according to claim 1, further comprising:

selecting the values of the related coefficients from pre-calculated tables based upon the value of the phase $\phi(k)$ of the particular read sample.

6. The reading process according to claim 5, further comprising:

precalculating the values of the related coefficients for N phase segments, N being a positive integer and each of the phase segments having a width $N/2\pi$ and choosing the values for the related coefficients, wherein the phase $\phi(k)$ of the particular read sample belongs to one of the N phase segments.

7. The reading process according to claim 1, further comprising:

selecting the weighted values which may be taken by the particular read sample and the number of the successive ones of the succession of read samples being used after weighting by the related coefficient from a table; and precalculating the weighted values for said table for N phase segments, N being a positive integer and each of the phase segments having a width $N/2\pi$, wherein the values of the particular read sample and for the number of the successive ones of the succession of read samples are taken from among all values which may be taken by any of the read samples so that the values taken are values corresponding to a phase segment to which the phase $\phi(k)$ of the particular read sample belongs.

8. The reading process according to claim 1, further comprising:

sorting interpolated samples according to whether the interpolated samples are validated by having been provided with the information item or invalidated and having not been provided with the information item.

9. The reading process according to claim 8, further comprising:

grouping the validated interpolated samples together into packets comprising a succession of words.

10. The reading process according to claim 8, further comprising:

reading a single track and then sorting the interpolated samples by storing the interpolated samples having been provided with the information item.

11. The reading process according to claim 1, wherein the magnetic carrier includes plural non-synchronously readable information tracks.

12. A system for reading binary information written on a magnetic carrier in at least one track, the binary information having been written onto the carrier at a frequency Fbit, comprising:

a magnetic head reading said binary information at a sampling frequency $F_e$ so as to form a succession of k successive read samples from the at least one track, k being a positive integer;

an interpolation portion calculating an interpolated sample for each read sample using a particular read sample and a number of successive ones of the succession of read samples which precede and follow the particular read sample, with each of the number of successive ones of read samples and the particular read sample being weighted by related coefficients, each of the related coefficients having a respective value dependent on a particular law of interpolation chosen; and a validation generator providing an information item indicating whether or not the calculated interpolated sample is a validated interpolated sample or an invalidated interpolated sample.

13. The system for reading binary information according to claim 12, wherein the interpolation portion further comprises:

multipliers, each multiplier having a first input and a second input, and an adder, wherein the successive read samples are respectively applied to the first input of each of the multipliers and the respective coefficients are respectively applied to the second input of each of the multipliers with an output from each multiplier being applied to the adder so as to obtain the interpolated sample, and further wherein the validation generator further comprises:

a validation operator to which phase signals indicating a phase interval associated with the phase $\phi(k)$ of the read sample and the phase $\phi(k+1)$ of an adjacent in time read sample of the succession of successive read samples are applied, wherein the validation operator compares a value of an upper bound of a validation window to the phase interval indicated by the phase signals applied and generates a signal enabling the interpolated sample to be validated when the upper bond does not exceed the phase interval indicated by the phase signals applied and generates a signal preventing the interpolated sample from being validated if the upper bond exceeds the phase interval indicated by the phase signals applied.

14. The reading system according to claim 12, further comprising:

a sort operator enabling retention of only the validated interpolated samples.

15. The reading system according to claim 12 wherein the magnetic carrier includes several non-synchronously readable information tracks.

16. A system for reading binary information written on a magnetic carrier in at least one track, the binary information having been written onto the carrier at a frequency Fbit, comprising:

a magneto-optic reading head transforming into luminous information the binary information read simultaneously on the at least one track at a sampling frequency $F_e$;

a charge-transfer photosensitive device gathering the luminance information and transforming the luminance information into a succession of successive voltage samples, the photosensitive device further comprising at least one output supplying the voltage samples, a delay portion connected to the at least one output and rearranging the voltage samples supplied by the at least one output so as to obtain a succession of k voltage samples from the at least one track, k being a positive integer;

an interpolation portion calculating an interpolated sample for each voltage sample using a particular voltage sample and a number of successive ones of the succession of voltage samples which precede and follow the particular voltage sample, with each of the number of successive ones of voltage samples and the particular voltage sample being weighted by related coefficients, each one of the coefficients having a respective value dependent on a particular law of interpolation chosen; and a validation generator providing an information item indicating whether or not the calculated interpolated sample is a validated interpolated sample or an invalidated interpolated sample.

17. The reading system according to claim 16, wherein the charge-transfer photosensitive device comprises a photosensitive zone having a linear array of pixels and of a non-photosensitive zone having a read register with transfer stages, the charge generated in a pixel being gathered in a transfer stage of the read register, the read register having Q sub-registers, O being a positive integer, with each sub-register comprising M transfer stages, M being a positive integer which may be different for two different sub-registers, the M transfer stages of each sub-register following one another so that the charge is transferred from a preceding stage to a succeeding stage, the transfer stage of each sub-register comprising a read diode converting variations in charge which the read diode detects into voltage variations, each read diode of each sub-register comprising an output of the read register.

18. The system for reading binary information according to claim 16, wherein the interpolation portion further comprises:

multipliers, each multiplier having a first input and a second input, and an adder, wherein the successive read samples are respectively applied to the first input of each of the multipliers and the respective coefficients are respectively applied to the second input of each of the multipliers with an output from each multiplier being applied to the adder so as to obtain the interpolated sample, and further wherein the validation generator further comprises:

a validation operator to which phase signals indicating a phase interval associated with the phase $\phi(k)$ of the read sample and the phase $\phi(k+1)$ of an adjacent in time read sample of the succession of successive read samples are applied, wherein the validation operator compares a value of an upper bound of a validation window to the phase interval indicated by the phase signals applied and generates a signal enabling the interpolated sample to be validated when the upper bond does not exceed the phase interval indicated by the phase signals applied and generates a signal preventing the interpolated sample from being validated if the upper bond exceeds the phase interval indicated by the phase signals applied.

19. The reading system according to claim 16, further comprising:

a sort operator enabling retention of only the validated interpolated samples.

20. The reading system according to claim 16, wherein the magnetic carrier includes plural non-synchronously readable information tracks.

* * * * *